(12) United States Patent
Kelley

(10) Patent No.: US 6,721,562 B2
(45) Date of Patent: Apr. 13, 2004

(54) METHOD AND APPARATUS FOR BAND CLASS ACQUISITION AND ASSIGNMENT IN A WIRELESS COMMUNICATION SYSTEM

(75) Inventor: Sean S. Kelley, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/356,004

(22) Filed: Jan. 31, 2003

(65) Prior Publication Data

US 2003/0148764 A1 Aug. 7, 2003

Related U.S. Application Data

(60) Provisional application No. 60/355,469, filed on Feb. 7, 2002.

(51) Int. Cl.[7] .................................................. H04Q 7/20
(52) U.S. Cl. .................. 455/434; 455/552.1; 455/435.2
(58) Field of Search .............................. 455/434, 435.1, 455/436, 437, 438, 439, 448, 450, 453, 552.1, 553.1, 435.2

(56) References Cited

U.S. PATENT DOCUMENTS

| 6,374,109 B1 | * | 4/2002 | Shaheen et al. ............. 455/434 |
| 6,456,858 B1 | * | 9/2002 | Streter ...................... 455/552.1 |
| 6,597,927 B1 | * | 7/2003 | Eswara et al. ............... 370/334 |

* cited by examiner

Primary Examiner—Erika Gary
(74) Attorney, Agent, or Firm—Steven A. May

(57) ABSTRACT

A communication system 100 acquires band class information and assigns a band class to MS 102 when the MS is engaged in a process of initiating a connection with infrastructure 104. The MS informs the infrastructure of the MS's band class capabilities when the MS initially performs an access attempt with the infrastructure in a reveres link associated with a first band class, that is, on r-csch 142 in reverse link 140. When the band class where the MS initially attempts access is congested, or the infrastructure desires to switch the MS to a second, alternate band class for any other reason, the infrastructure is able to immediately determine the band classes supported by the MS and to immediately assign the MS to a f-csch 132 or traffic channel 134 in a forward link 130 that is associated with the second, alternate band class supported by the MS.

18 Claims, 3 Drawing Sheets

300

| SUB-FIELD | SUB-FIELD LENGTH (bits) | SUB-FIELD DESCRIPTION |
|---|---|---|
| 301— BAND_CLASS_0 | 1 | 800 MHz CELLULAR BAND |
| 302— BAND_CLASS_1 | 1 | 1.8 TO 2.0 GHz PCS BAND |
| 303— BAND_CLASS_2 | 1 | BAND |
| 304— BAND_CLASS_3 | 1 | BAND |
| 305— BAND_CLASS_4 | 1 | PCS BAND |
| 306— BAND_CLASS_5 | 1 | 450 MHz NMT BAND |
| 307— BAND_CLASS_6 | 1 | 2 GHz IMT-2000 BAND |
| 308— BAND_CLASS_7 | 1 | 700 MHz BAND |
| 309— BAND_CLASS_8 | 1 | 1800 MHz BAND |
| 310— BAND_CLASS_9 | 1 | 900 MHz BAND |
| 311— BAND_CLASS_10 | 1 | SECONDARY 800 MHz BAND |
| 312— RESERVED | 5 | |

*FIG. 3*

METHOD AND APPARATUS FOR BAND CLASS ACQUISITION AND ASSIGNMENT IN A WIRELESS COMMUNICATION SYSTEM

REFERENCE(S) TO RELATED APPLICATION(S)

The present application claims priority from provisional application, Serial No. 60/355,469, entitled "METHOD AND APPARATUS FOR BAND CLASS ACQUISITION AND ASSIGNMENT IN A WIRELESS COMMUNICATION SYSTEM," filed Feb. 7, 2002, which is commonly owned and incorporated herein by reference in its entirety.

FIELD OF THE INVENTION

The present invention relates generally to cellular communication systems, and, in particular, to mobile stations and base stations that support multiple band classes in a cellular communication system.

BACKGROUND OF THE INVENTION

The TIA/EIA (Telecommunications Industry Association/Electronic Industries Association) IS-2000 standard provides an Extended Channel Assignment Message (ECAM) that includes the capability for a communication system to assign a mobile station (MS) to a paging channel or a traffic channel in a different, alternate frequency band class than a frequency band class initially accessed by the MS. This capability, for example, allows the communication system to level the loads of multiple frequency band classes in the event that one of the band classes becomes particularly congested.

However, not all MS's are able to support operations in each of multiple band classes. As a result, when an MS is accessing the communication system, and the communication system wishes to assign the MS to the alternate band class, the communication system must first determine the MS's band class capability by engaging in a band class negotiation with the MS using Status Request/Status Response messages. The communication system sends a Status Request Message (SRM) on a forward common signaling channel (f-csch) that requests that the MS provide it's band class capabilities. In response to receiving the SRM, the MS sends an Extended Status Response Message (ESRM) to the communication system on a reverse common signaling channel (r-csch) that informs of the MS's band class capabilities. Upon receiving the ESRM, the communication system is then able to determine if the MS supports the alternate band class and send an ECAM to the MS. This exchange of messages on the common signaling channels prior to a channel assignment consumes system capacity, delays a call setup process, and can cause a higher probability of call setup failures.

Therefore a need exists for a method and an apparatus that determines an MS's band class capabilities and assigns the MS to a new band class without the system capacity consumption and the call setup delay of the prior art.

BRIEF DESCRIPTION OF THE DRAWINGS

FIG. 3 is a table of sub-fields included in a band class information data field in accordance with an embodiment of the present invention.

DETAILED DESCRIPTION OF THE INVENTION

To address the need for a method and an apparatus that determines band class capabilities of a mobile station (MS) and assigns the MS to a new band class without the system capacity consumption and the call setup delay of the prior art, a communication system acquires band class information and assigns a band class to the MS when the MS is engaged in a process of initiating a connection with an infrastructure. The MS informs the infrastructure of the MS's band class capabilities when the MS initially performs an access attempt with the infrastructure in a reverse link associated with a first band class, that is, on a reverse common signaling channel (r-csch) in the reverse link. When the band class where the MS initially attempts access is congested, or the infrastructure desires to switch the MS to a second, alternate band class for any other reason, the infrastructure is able to immediately determine the band classes supported by the MS and to immediately assign the MS to a forward common signaling channel (f-csch) or a traffic channel in a forward link that is associated with the second, alternate band class supported by the MS.

Generally, an embodiment of the present invention encompasses a method for acquiring band class information and assigning a band class to a mobile station included in a wireless communication system when the mobile station is engaged in a process of initiating a connection with an infrastructure of the wireless communication system, wherein the infrastructure supports a plurality of band classes. The method includes steps of requesting band class information from the mobile station, receiving band class information from the mobile station, and determining whether to assign the mobile station to a band class other than a band class that the mobile station is currently accessing. The method further includes a step of, when the mobile station supports the alternate band class, instructing the mobile station to switch to the alternate band class based on a determination to assign the mobile station to the alternate band class.

Another embodiment of the present invention encompasses an apparatus for acquiring band class information from a mobile station and assigning a band class to the mobile station when the mobile station is engaged in a process of initiating a connection with an infrastructure that supports a plurality of band classes. The apparatus includes a base station that requests band class information from the mobile station, receives band class information from the mobile station in response to the request, determines whether to assign the mobile station to a band class other than a band class that the mobile station is currently accessing, and, when the mobile station supports the alternate band class, instructs the mobile station to switch to the alternate band class based on a determination to assign the mobile station to the alternate band class.

Figure 1:
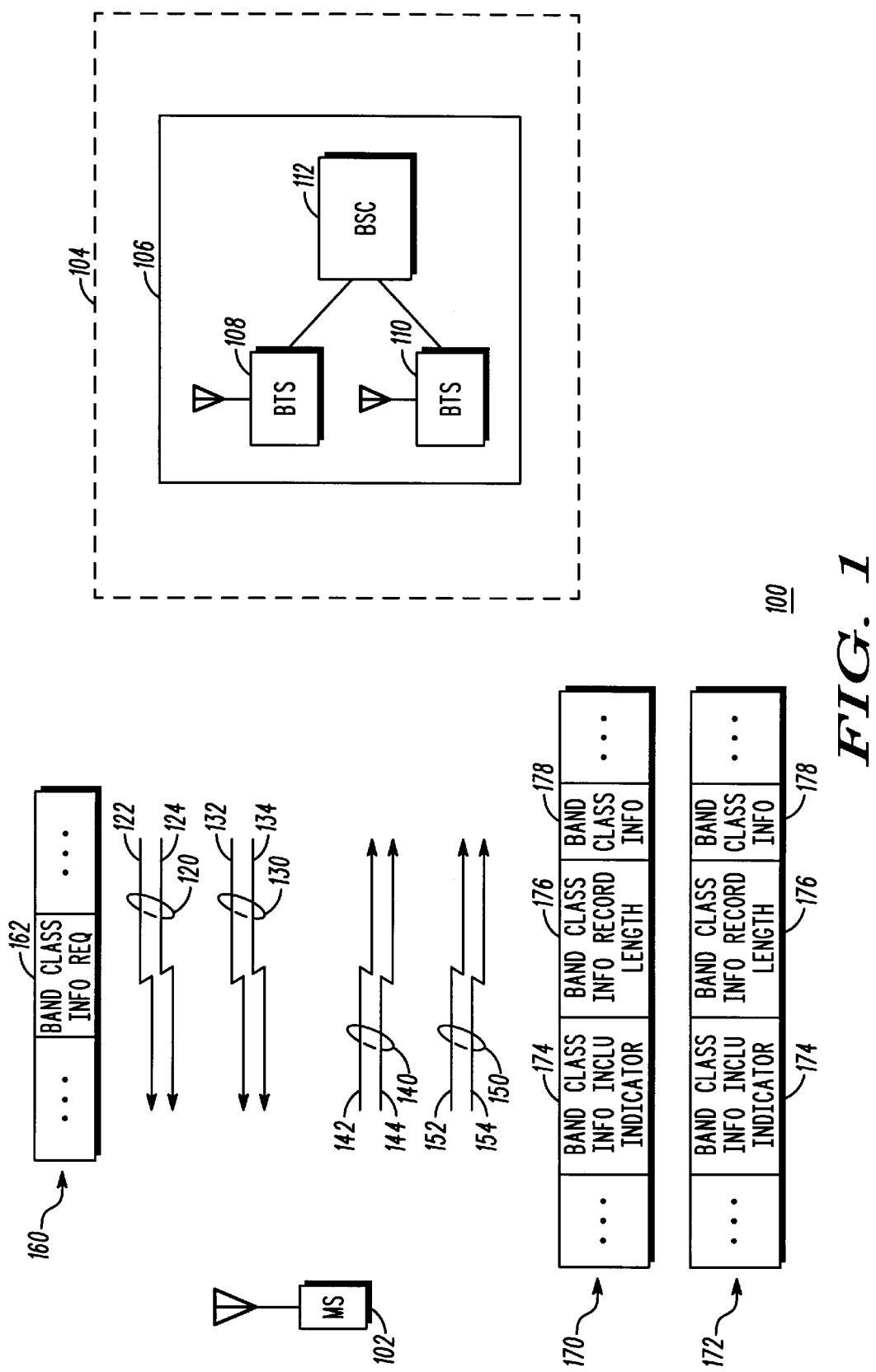
FIG. 1 is a block diagram of a wireless communication system in accordance with an embodiment of the present invention.

The present invention may be more fully described with reference to FIGS. 1–3. FIG. 1 is a block diagram of a wireless communication system 100 in accordance with an embodiment of the present invention. Communication system 100 includes at least one mobile station (MS) 102 in wireless communication with a communication system infrastructure 104. Infrastructure 104 includes at least one base station (BS) 106 having multiple base transceiver stations (BTS's) 108, 110 (two shown) that are each operably coupled to a base station controller (BSC) 112. BS 106 is capable of providing communications services in each of multiple band classes to mobile stations located in a coverage area serviced by the BS, which coverage area may be subdivided into multiple sectors, or cells, that are each served by one or more of the multiple BTS's 108, 110 included in the BS. Each band class of the multiple band classes supported by BS 106 is associated with a particular frequency bandwidth and a particular signal modulation scheme and is further associated with one of multiple forward links 120, 130 (two shown) and one of multiple reverse links 140, 150 (two shown). Each forward link 120, 130 is associated with and operates in one of the multiple band classes and includes a respective forward common signaling channel (f-csch) 122, 132, and a respective forward traffic channel 124, 134. Each reverse link 140, 150 also is associated with and operates in one of the multiple band classes and includes a respective reverse common signaling channel (r-csch) 142, 152 and a respective reverse traffic channel 144, 154.

MS 102 includes a processor and a memory associated with the processor that stores programs and software such as programs, applications, and operating protocols, that are executed by the processor and that permit the functioning of the MS in system 100. MS 102 is capable of operating in, that is, supporting, at least one band class of the multiple band classes supported by infrastructure 104, and the memory of MS 102 further stores information concerning each band class that can be supported by the MS, such as the list of band classes described below with respect to FIG. 3.

Communication system 100 comprises a wireless communication system that supports multiple band classes. In order for MS 102 to establish a connection with an external network (not shown) connected to infrastructure 104, BS 106 operates in accordance with well-known wireless telecommunications protocols. By operating in accordance with well-known protocols, a user of MS 102 can be assured that MS 102 will be able to communicate with infrastructure 104 and establish a communication link with the external network via the infrastructure. Preferably, communication system 100 operates in accordance with the 3GPP2 and TIA/EIA (Telecommunications Industry Association/Electronic Industries Association) IS-2000 standards, which provide a compatibility standard for cdma2000, including IS-2000 air interfaces. The standard specifies wireless telecommunications system operating protocols, including radio system parameters and call processing procedures. However, those who are of ordinary skill in the art realize that communication system 100 may operate in accordance with any one of a variety of wireless communication systems, such as a Global System for Mobile communication (GSM) communication system, a Time Division Multiple Access (TDMA) communication system, a Frequency Division Multiple Access (FDMA) communication system, or an Orthogonal Frequency Division Multiple Access (OFDM) communication system.

When a user of MS 102 initiates a wireless connection with infrastructure 104 by performing an access attempt on r-csch 142 in a first reverse link 140 associated with a first band class, infrastructure 104 assigns a base station (BS), that is, BS 106, to provide communication services to MS 102. MS 102 also monitors a f-csch 122 in a first forward link 120 associated with the first band class for messages from infrastructure 104. In the prior art, when an infrastructure determines that the band class initially accessed by an MS is congested, a BS serving the MS then queries the MS concerning the MS's band class capabilities. The MS and BS then engage in a band class negotiation via an exchange of Status Request/Status Response messages to determine the MS's band class capabilities before the MS may be switched to a different band class and a different forward link via an Extended Channel Assignment Message (ECAM). This negotiation delays call setup for the MS and consumes system capacity for other MS's seeking to access the band class initially accessed by the MS, such as MS's that support only that band class.

In communication system 100, MS 102 informs infrastructure 104 of the MS's band class capabilities when the MS initially performs an access attempt with the infrastructure on a r-csch 142 in a reverse link 140 associated with a first band class. If the band class where MS 102 initially attempts access is congested, infrastructure 104 is able to immediately determine the band classes supported by MS 102 and to immediately assign the MS to a f-csch 132 or a traffic channel 134 in a forward link 130 that is associated with a second, alternate band class supported by the MS. This avoids engaging in protracted band class negotiations on the f-csch 122 and r-csch 142 associated with the first band class prior to channel assignment, such as traffic channel or common signaling channel assignment, or avoids first assigning MS 102 to a traffic channel or common signaling channel on the congested band class where the MS initially attempts access and then later moving the MS to an alternate band class after band class negotiation on forward traffic channel 124 and reverse traffic channel 144.

Figure 2:
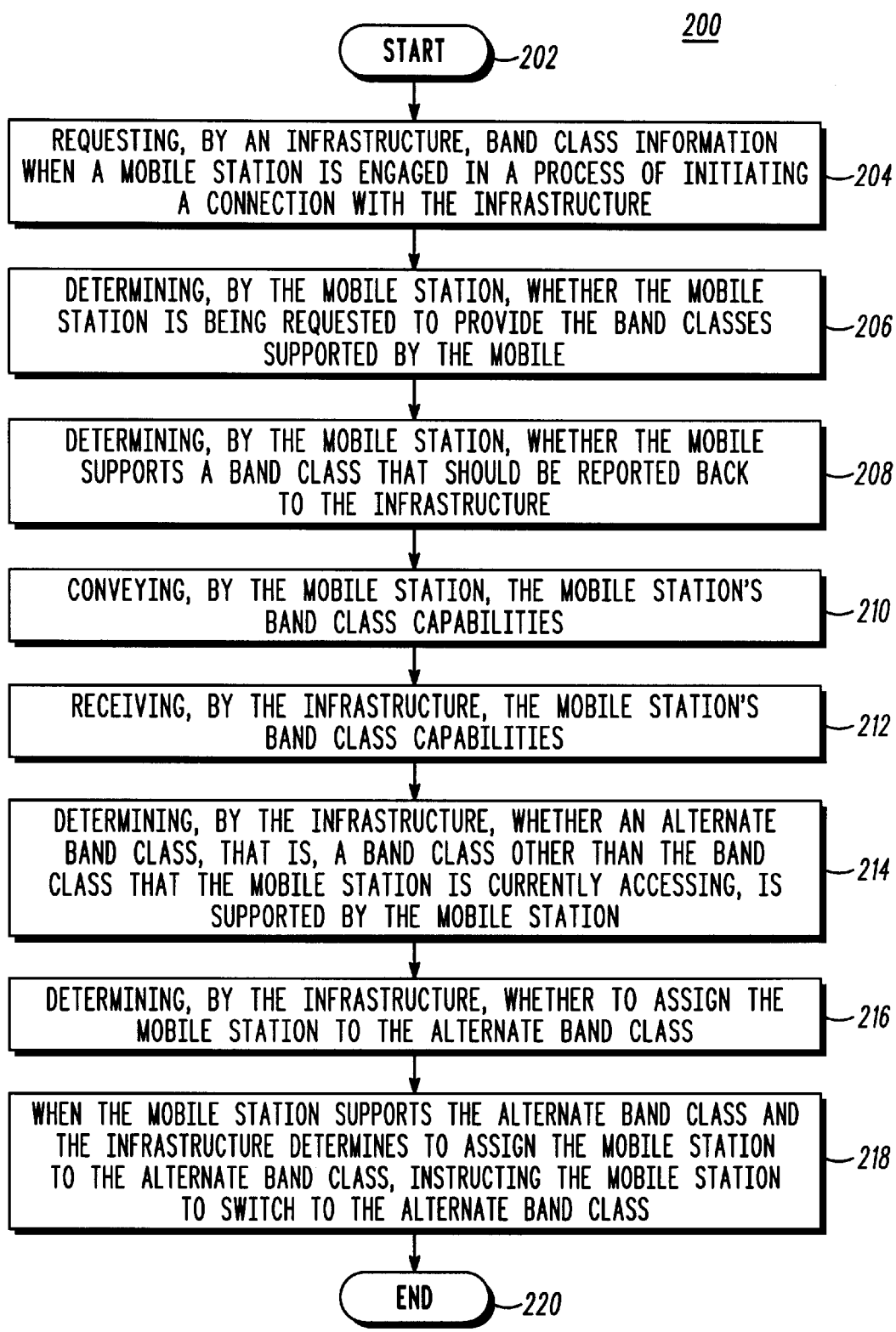
FIG. 2 is a logic flow diagram of steps executed by the communication system of FIG. 1 in acquiring band class information from the mobile station of FIG. 1 during an access attempt by the mobile station in accordance with an embodiment of the present invention

FIG. 2 is a logic flow diagram 200 of steps executed by communication system 100 in acquiring band class information from MS 102 during an access attempt by the MS in accordance with an embodiment of the present invention. Logic flow diagram 200 begins (202) when infrastructure 104, preferably BS 106, requests (204) from MS 102, while the MS is engaged in a process of initiating a connection with the infrastructure, information concerning the band classes supported by the MS.

Preferably, BS 106 requests the band class information via a first overhead message 160, such as a modified access parameters message or a modified extended system parameters message (ESPM), that is conveyed to MS 102 over forward common signaling channel (f-csch) 122. Access parameters messages contain parameters used in random access procedures, are well-known in the art and are described in detail in the TIA/EIA IS-2000.5-A standard, sections 3.7.2.3.2.2 and 3.7.2.3.2.33. ESPM messages contain system configuration parameters, are also well known in the art, and are described in detail in the TIA/EIA IS-2000.5-B standard, sections 3.7.2.3.2.13. In communication system 100, overhead message 160 may comprise an access parameters message or an ESPM that is modified to include a 'band class information request' data field 162 comprising a single bit. 'Band class information request' data field 162 is used to inquire whether MS 102 supports particular band classes that are pre-defined, such as all band classes defined in a standard such as TIA/EIA IS-2000. BS 106 sets the 'band class information request' data field 162 to '1' when MS 102 is to report the MS's capability to operate in each of the pre-defined band classes, and to '0' when MS 102 is not to report the MS's band class capabilities.

Upon receiving overhead message 160, MS 102 determines (206) whether the MS is being requested to provide the band class capabilities of the MS by reference to 'band class information request' data field 162 in the overhead message. When MS 102 determines that the MS's band class capabilities have been requested, MS 102 determines (208) whether the MS supports an alternate band classes that should be reported back to infrastructure 104. That is, when the band class capability of BS 106 is known, MS 102 determines whether the MS supports at least one of the alternate band classes supported by BS 106, and when the band class capability of BS 106 is unknown, MS 102 determines whether the MS supports any alternate band classes. MS 102 then conveys (210) to BS 106, and BS 106 (212) receives from the MS, the MS's band class capabilities via a modified access channel message, preferably a modified origination message 170 or a modified page response message 172, over reverse common signaling channel (r-csch) 142. Origination messages and page response messages are used by an MS to establish a connection with an infrastructure, are well-known in the art and are described in detail in the TIA/EIA IS-2000.5-A standard, section 2.7.1.3.2.4 and 2.7.1.3.2.5.

Infrastructure 104, preferably BS 106, determines (214) which band classes are supported by MS 102 by immediately referencing the MS 102 band class capability information provided in the modified access channel message, that is, in modified origination message 170 or modified page response message 172. Infrastructure 104, preferably BS 106, also determines (216) whether to assign MS 102 to an alternate band class, that is, a band class other than the band class in which MS 102 is currently accessing (i.e., the band class associated with forward link 120). For example, infrastructure 104 may determine to assign MS 102 to an alternate band class because the band class in which MS 102 is accessing is congested, that is, that forward link 120 or reverse link 140 is congested. By way of another example, infrastructure 104 may determine to assign MS 102 to an alternate band class in order to free up the current band class for emergency communications. One who is of ordinary skill in the art realizes that numerous reasons exist for switching MS 102 to a band class other than the band class in which the MS is currently accessing without departing from the spirit and scope of the present invention.

When infrastructure 104 determines that MS 102 supports an alternate band class, such as a less congested band class than the current band class, and further determines to assign the MS to the alternate band class, infrastructure 104, preferably BS 106, instructs (218) MS 102, by sending an extended channel assignment message (ECAM) via BS 106, to switch to the alternate band class. For example, when BS 106 determines to switch MS 102 to a band class other than the band class associated with the forward link 120 that MS 102 is currently accessing, and further determines that MS 102 supports a band class associated with forward link 130, BS 106 instructs MS 102 to switch to forward link 130 and to the forward traffic or common signaling channels 132, 134 associated with the forward link. The logic flow then ends (220).

Infrastructure 104, that is BS 106, determines the band classes supported by MS 102 by immediate reference to the modified origination message 170 or page response message 172 received from the MS. By having the band class capability information of MS 102 immediately available when the MS accesses with the infrastructure, infrastructure 104 is able to switch MS 102 to an alternate band class without engaging in a protracted negotiation with the MS of the band classes supported by the MS or referencing a database. By avoiding a protracted band class negotiation or database lookup, communication system 100 is able to more quickly switch MS 102 to the alternate band class, thereby more quickly completing call setup of MS 102, reducing the probability of call setup failure, minimizing the resources used in the current congested band class (i.e., forward link 120), and freeing up capacity for new users that do not support the alternate band class.

Unlike origination messages and page response messages of the prior art, modified origination message 170 and modified page response message 172 are modified to include a 'band class information included indicator' data field 174. Preferably, 'band class information included indicator' data field 174 is a one-bit data field that is set to '1' if MS 102 supports a band class other than the current band class (i.e., the band class associated with forward link 120), such as the band class associated with forward link 130, and to '0' if the MS does not support a band class other than the current band class. When communication system 100 supports more than one band class and the 'band class information included indicator' data field 174 is set to '1', the modified origination message or page response message 170, 172 may further include information indicating which one or more of the more than one band class are supported by MS 102. Preferably, the modified origination message or page response message 170, 172 is further modified to include a 'band class information record length' data field 176 and a 'band class information' data field 178. However, in another embodiment of the present invention, the modified origination message or page response message 170, 172 may include only 'band class information' data field 178. 'Band class information record length' data field 176 informs of a record length, preferably in terms of a number of octets, of the 'band class information' data field 178, minus one, and preferably comprises two bits. 'Band class information' data field 178 indicates which band classes are supported by MS 102 and preferably comprises '8×(record length+1)' bits. When 'band class information included indicator' data field 174 is set to '0,' 'band class information record length' data field 176 and 'band class information' data field 178 may each be omitted from the modified origination or page response message 170, 172.

'Band class information' data field 178 includes multiple sub-fields, wherein each sub-field of the multiple sub-fields is associated with one band class of the multiple band classes, such as well known band classes defined in a standard such as TIA/EIA IS-2000. FIG. 3 is a table 300 of sub-fields 301–312 included in the band class information data field 178 in accordance with an embodiment of the present invention. Preferably, 'band class information' data field 178 includes multiple, preferably twelve (12), sub-fields 301–312. Each sub-field of the multiple sub-fields 301–312 comprises one bit, except for a 'Reserved' sub-field 312 that comprises five (5) bits. When a sub-field 301–311 is set to '1,' that indicates that a mobile station transmitting the modified origination message or page response message 170, 172, that is, MS 102, supports the corresponding band class. When a sub-field 301–311 is set to '0,' that indicates that the mobile station does not support the corresponding band class. If MS 102 does not support any of the band classes corresponding to sub-fields 301–311, the mobile station preferably sets the 'band class information included indicator' data field 174 to '0' and omits the 'band class information record length' and 'band class information' data fields 176, 178 to more efficiently indicate that it does not support any band class other than the current band class. The band classes corresponding to each sub-field of the eleven (11) non-'Reserved' sub-fields 301–311, and the corresponding description of each sub-field, are as follows:

| Band Class | Band Class Description |
|---|---|
| BAND_CLASS_0 | 800 MHz cellular band |
| BAND_CLASS_1 | 1.8 to 2.0 GHz PCS band |
| BAND_CLASS_2 | 872 to 960 MHz TACS band |
| BAND_CLASS_3 | 832 to 925 MHz JTACS band |
| BAND_CLASS_4 | 1.75 to 1.87 GHz Korean PCS band |
| BAND_CLASS_5 | 450 MHz NMT band |
| BAND_CLASS_6 | 2 GHz IMT-2000 band |
| BAND_CLASS_7 | 700 MHz band |
| BAND_CLASS_8 | 1600 MHz band |
| BAND_CLASS_9 | 900 MHz band |
| BAND_CLASS_10 | Secondary 800 MHz band |

The five bits of 'Reserved' sub-field 312 are set to '00000.' The 'Reserved' bits are included in 'band class information' data field 178 for the purpose of allowing the data field to provide information on additional band classes as more band classes are defined. However, as those who are of ordinary skill in the art realize, the number of sub-fields included in the band class information data field 178, and the band class description corresponding to each sub-field, are up to a designer of a wireless communication system. For example, a band class information data field for a communication system that accommodates fewer than 11 band classes may include fewer sub-fields than the above-listed 11 sub-fields and 5 reserved bits. On the other hand, a band class information data field for a communication system that accommodates more than 16 band classes may include more than the above-listed 11 sub-fields and 5 additional reserved bits.

By adding only a single bit to the overhead message 160 conveyed by BS 106 to MS 102, and identifying the band classes supported by the MS in the origination message or page response message conveyed by the MS to the BS, forward common signaling channel 122 is minimally impacted by the exchange of band class information and most of the cost of capacity is borne by reverse common signaling channel 142. Since forward common signaling channels are typically more congested than reverse common signaling channels, the capacity cost of the exchange of band class information is being placed on the channel that can best afford to bear it.

In another embodiment of the present invention, the 'band class information request' data field 162 included in overhead message 160 may be expanded to further inquire whether MS 102 supports particular band classes that are identified in data field 162. For example, communication system 100 may not support all of the multiple band classes 301–311 that may be responded to in 'band class information' data field 178 and may want to limit the inquiry of MS 102 and response by MS 102 to a select group of band classes that the system does support. When overhead message 160 identifies particular band classes, then in response to a respective overhead message 160 that identifies particular band classes, the 'band class information' data field 178 in a modified origination message or page response message 170, 172 may include information indicating whether MS 102 is capable of operating in each of the particular band classes identified in the expanded 'band class information request' data field 162 of overhead message 160. 'Band class information record length' data field 176 informs of a record length, preferably in terms of a number of particular band classes being reported in the 'band class information' data field 178, minus one, and preferably comprises two bits. 'Band class information' data field 178 indicates which band classes are supported by MS 102 and preferably comprises '(record length+1)' bits. If MS 102 does not support any of the particular band classes identified in the expanded 'band class information request' data field 162 of overhead message 160, the mobile station preferably sets the 'band class information included indicator' data field 174 to '0' and omits the 'band class information record length' and 'band class information' data fields 176, 178 to more efficiently indicate that it does not support any of the particular band classes identified in overhead message 160. When communication system 100 supports only two band classes, the band classes supported by MS 102 can be indicated by whether MS 102 reports back a '0' or a '1' in data field 174, and no additional data fields are added to the modified origination or page response message 170, 172.

By designating the particular band classes in an overhead message, sent by the BS to the MS, in regard to which infrastructure 104 desires to be informed, and then requiring that MS 102 only respond with respect to the designated band classes, the capacity cost for the exchange of band class information is more equally distributed between the forward and reverse common signaling channels 122, 142. While this places a greater burden upon the forward common signaling channel 122, overall bit efficiency is increased since the origination message or page response message sent by the MS to the BS only responds with respect to the band classes identified in the overhead message.

By providing for inclusion of a request for band class information in an overhead message 160, such as a modified access parameters message or a modified ESPM, conveyed by infrastructure 104 to MS 102, and then providing for inclusion of MS 102's band class information in a modified access channel message 170, 172, conveyed by MS 102 to infrastructure 104, communication system 100 is able to acquire band class information and assign a band class to MS 102 when the MS is engaged in a process of initiating a connection with infrastructure 104. In one embodiment of the present invention, overhead message 160 includes a one-bit request for band class information, and the modified access channel message 170, 172 includes information concerning alternate band classes supported by MS 102. In another embodiment of the present invention, overhead message 160 may further identify particular band classes concerning which infrastructure 104 is inquiring, and MS 102 may respond in regard to the particular band classes.

MS 102 informs infrastructure 104 of the MS's band class capabilities when the MS initially performs an access attempt with the infrastructure in a reveres link associated with a first band class, that is, on r-csch 142 in reverse link 140. When the band class where MS 102 initially attempts access is congested, or infrastructure 104 desires to switch the MS to a second, alternate band class for any other reason, the infrastructure is able to immediately determine the band classes supported by MS 102 and to immediately assign the MS to a f-csch 132 or traffic channel 134 in a forward link 130 that is associated with the second, alternate band class supported by the MS. This avoids engaging in protracted band class negotiations on the f-csch 122 and r-csch 142 prior to channel assignment, or avoids first assigning MS 102 to a traffic channel or a common signaling channel on the congested band class where the MS initially attempts access and then later moving the MS to an alternate band class after band class negotiation on forward traffic channel 124 and reverse traffic channel 144, thereby avoiding delays in a call setup process and reducing a probability of call setup failures.

While the present invention has been particularly shown and described with reference to particular embodiments thereof, it will be understood by those skilled in the art that various changes may be made and equivalents substituted for elements thereof without departing from the spirit and scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. In a wireless communication system comprising a mobile station in communication wilt an infrastructure that supports a plurality of band classes, a method for acquiring band class information and assigning a band class to the mobile station when the mobile station is engaged in a process of initiating a connection with the infrastructure, the method comprising steps of:
   requesting band class information from the mobile station via an overhead message, wherein the overhead message further indicates at least one band class supported by the infrastructure;
   receiving, by the mobile station, the overhead message;
   determining, by the mobile station, whether the overhead message comprises a request that the mobile station provide band class information; and
   in response to receiving the overhead message, conveying, by the mobile station to the infrastructure, information concerning band classes supported by the mobile station including whether the mobile station supports the indicated at least one band class;
   receiving band class information from the mobile station;
   determining whether to assign the mobile station to a band class other than a band class that the mobile station is currently accessing; and
   when the mobile station supports the alternate band class, instructing the mobile station to switch to the alternate band class based on a determination to assign the mobile station to the alternate band class.

2. The method of claim 1, further comprising a step of determining, by the mobile station, whether the mobile station supports a band class that should be reported back to the infrastructure, and wherein the step of conveying, by the mobile station, the band class information comprises a step of conveying, by the mobile station, the band class information when the mobile station determines that it supports a band class that should be reported back to the infrastructure.

3. The method of claim 1, wherein the overhead message comprises a band class information request data field.

4. In a wireless communication system comprising a mobile station in communication with an infrastructure that supports a plurality of band classes, a method for acquiring band class information and assigning a band class to the mobile station when the mobile station is engaged in a process of initiating a connection with the infrastructure, the method comprising steps of:
   requesting band class information from the mobile station;
   receiving an access channel message comprising band class information of the mobile station wherein the access channel message comprises an indicator of whether the mobile station supports a band class other than the band class that the mobile station is currently accessing;
   determining whether to assign the mobile station to a band class other than a band class that the mobile station is currently accessing; and
   when the mobile station supports the alternate band class, instructing the mobile station to switch to the alternate band class based on a determination to assign the mobile station to the alternate band class.

5. The method of claim 4, wherein the access channel message is an origination message.

6. The method of claim 4, wherein the access channel message is a page response message.

7. The method of claim 4, wherein the access channel message further comprises a data field that informs which band classes are supported by the mobile station.

8. The method of claim 7, wherein the access channel message further comprises a data field that informs of a record length of the data field that informs which band classes are supported by the mobile station.

9. The method of claim 4, wherein the access channel message further comprises a band class information data field that comprises a plurality of sub-fields, wherein each sub-field of the plurality of sub-fields corresponds to a band class of the plurality of band classes supported by the infrastructure, and wherein each sub-field comprises an indicator of whether the mobile station supports the corresponding band class.

10. An apparatus for acquiring band class information from a mobile station and assigning a band class to the mobile station when the mobile station is engaged in a process of initiating a connection with an infrastructure that supports a plurality of band classes, the apparatus comprising;
   a base station that requests band class information from the mobile station via an overhead message, wherein the overhead message further indicates at least one band class supported by the infrastructure, in response to the request, receives band class information from the mobile station, determines whether to assign the mobile station to a band class other than a band class that the mobile station is currently accessing, and, when the mobile station supports the alternate band class, instructs the mobile station to switch to the alternate band class based on a determination to assign the mobile station to the alternate band class; and
   the mobile station, wherein the mobile station receives the overhead message, determines whether the overhead message comprises a request that the mobile station provide band class information, and, in response to receiving the overhead message conveys information to the base station concerning band classes supported by the mobile station including whether the mobile station supports the indicated at least one band class.

11. The apparatus of claim 10, wherein the mobile station further determines whether the mobile station supports a band class that should be reported back to the infrastructure, and wherein the mobile station conveys the band class information when the mobile station determines that the mobile station supports a band class that should be reported back to the infrastructure.

12. The apparatus of claim 10, wherein the overhead message comprises a band class information request data field.

13. An apparatus for acquiring band class information from a mobile station and assigning a band class to the mobile station when the mobile station is engaged in a process of initiating connection with an infrastructure that supports a plurality of band classes, the apparatus comprising a base station that requests band class information from the mobile station, in response to the request, receives an access channel message comprising band class information of the mobile station, wherein the access channel message comprises an indicator of whether the mobile station supports a band class other than the band class that the mobile station is currently accessing, determines whether to assign the mobile station to a band class other than a band class that the mobile station is currently accessing, and, when the mobile station supports the alternate band class, instructs the mobile station to switch to the alternate band class based on a determination to assign the mobile station to the alternate band class.

14. The apparatus of claim 13, wherein the access channel message is origination message.

15. The apparatus of claim 13, wherein the access channel message is a page response message.

16. The apparatus of claim 13, wherein the access channel message further comprises a data field that informs which band classes are supported by the mobile station.

17. The apparatus of claim 16, wherein the access channel message further comprises a data field that informs of a record length of the data field that informs which band classes are supported by the mobile station.

18. The apparatus of claim 13, wherein the access channel message further comprises a band class information data field that comprises a plurality of sub-fields, wherein each sub-field of the plurality of sub-fields corresponds to a band class of the plurality of band classes supported by the infrastructure, and wherein each sub-field comprises an indicator of whether the mobile station supports the corresponding band class.

* * * * *